Figure 1:
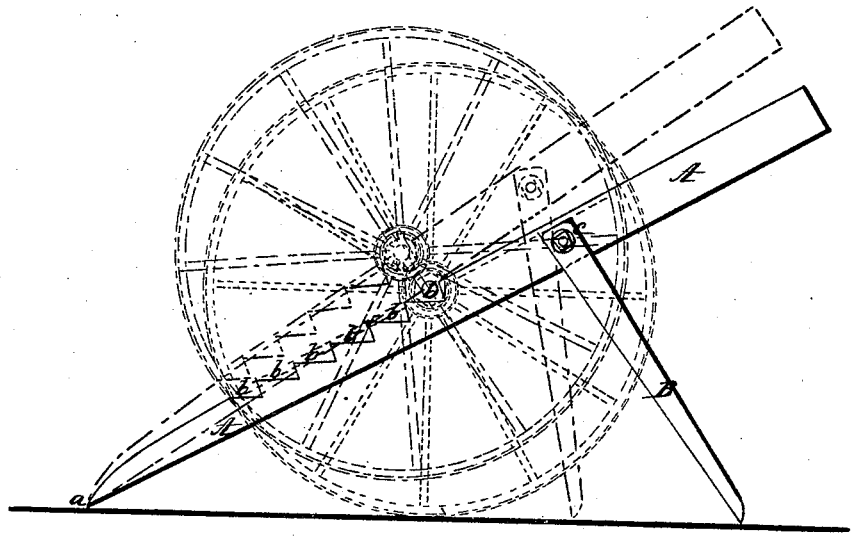

P. C. Porter,

Lifting Jack.

N° 68,572. Patented Sep. 3, 1867.

Witnesses:
R. Leech
A. J. Frank

Inventor:
Parker C. Porter
by his Atty
A. M. Smith

United States Patent Office.

PARKER C. PORTER, OF AUGUSTA, MAINE, ASSIGNOR TO HIMSELF AND R. M. MANSUR, OF SAME PLACE.

*Letters Patent No. 68,572, dated September 3, 1867.*

IMPROVEMENT IN CARRIAGE-JACK.

*The Schedule referred to in these Letters Patent and making part of the same.*

TO ALL WHOM IT MAY CONCERN:

Be it known that I, PARKER C. PORTER, of Augusta, in the county of Kennebec, and State of Maine, have invented a new and improved Carriage-Jack; and I do hereby declare the following to be a full, clear, and exact description of the construction and operation thereof, reference being had to the accompanying figure of drawing, making a part of this specification, and representing a side elevation of my improved jack, as constructed and applied for use.

The invention relates to the particular construction of the jack, whereby it is rendered extremely simple and durable in its character, not liable to get out of order, and is very easily handled or operated, as hereinafter explained.

To enable others to make and use my invention, I will describe the same with reference to the drawing, in which—

A represents a bar, constituting the main arm or lever of the implement, made in the form shown, or in any other desirable or suitable form, and of any desired dimensions, and pointed at lower or fulcrum end, as shown at $a$, to prevent its slipping over the surface of the ground when in operation. $b\ b$ is a series of notches or steps cut or otherwise formed on the upper face of the lever, and designed to receive and retain the axle to be raised, and so arranged that when the lever is in the position shown by the drawing they provide for different heights of axle, or the varying diameters of wheels of the different vehicles to which the jack is applied. The steps are formed at such an angle to the bar as that when the latter is in the inclined position for operation, shown by the figure the tread, or that part of the step or notch on which the axle rests, will be in a horizontal position, thereby obviating any tendency of the axle to slip thereon. B is a leg or pendant pivoted at its upper end to the arm or lever at $c$, in such manner as to be allowed to turn freely in relation thereto, so that when the one arm of the lever is raised, removing the leg out of contact with the surface of the ground, said leg or pendant will swing by its own gravity into a vertical position, in the manner represented by black and red lines in the drawing. The leg B may be forked at its pivoted end to embrace the bar A, or it may be provided with a tenon, working into a mortise, formed in the bar, or it may be simply connected by a bolt to one side of said bar, or by a hinge to the under surface of the bar. The notches $b\ b$, instead of being cut in the bar A, may be formed in an iron plate, attached by screws or otherwise to said bar, so that if the bar should at any time become broken, the said plate may be readily detached therefrom and applied to use in connection with another bar.

The operation will be readily understood. The bar A is thrust under the axle into position shown by the drawing, the leg or pendant dragging or being thrown forward or back into an inclined position, until the bar is sufficiently far under the axle to bring the desired notch or step $b$ underneath and in contact with the axle, when, one end of the bar or lever resting on the ground, the other is raised and the leg B swings into a vertical or nearly vertical position, in a manner represented by red lines in the drawing, and the axle is thereby held at the desired height, removing the wheel out of contact with the ground, until the bar is again lowered or dropped by the removal of the supporting leg or pendant B.

Having now described my invention, what I claim, and desire to secure by Letters Patent, is—

The notched or stepped bar or lever, in combination with the pivoted leg or pendant, constructed and operating in the manner and for the purpose set forth.

PARKER C. PORTER.

Witnesses:
P. McMAHAN,
J. H. GREELY.